United States Patent [19]

Ream et al.

[11] Patent Number: 4,882,175
[45] Date of Patent: Nov. 21, 1989

[54] METHOD FOR FORMING A CONFECTIONARY PRODUCT INTO A ROLLED TAPE

[75] Inventors: Ronald L. Ream, North Aurora; Robert D. Riedy, Naperville; Michael McHale, Aurora, all of Ill.

[73] Assignee: Wm. Wrigley Jr. Company, Chicago, Ill.

[21] Appl. No.: 190,664

[22] Filed: May 5, 1988

[51] Int. Cl.⁴ .......................... A23G 3/02; A23G 3/30
[52] U.S. Cl. ........................................ 426/5; 99/450.2; 425/322; 426/514; 426/518; 426/660
[58] Field of Search .................. 426/5, 514, 518, 660, 426/501; 99/450.2; 425/306, 307, 391; 264/157

[56] References Cited

U.S. PATENT DOCUMENTS

| | | | |
|---|---|---|---|
| 1,193,423 | 8/1916 | Pryor | 426/5 |
| 1,861,285 | 5/1932 | Ritzel | 426/5 |
| 3,051,583 | 8/1962 | Tindall | 426/115 |
| 3,172,372 | 3/1965 | Packman | 426/501 |
| 3,861,291 | 1/1975 | Guzaski | 425/391 |
| 4,170,914 | 10/1979 | Carrier | 83/580 |
| 4,465,208 | 8/1984 | Buban et al. | 221/279 |
| 4,526,790 | 7/1985 | Samala | 426/5 |
| 4,675,190 | 6/1987 | Glass et al. | 426/5 |

*Primary Examiner*—George Yeung
*Attorney, Agent, or Firm*—Willian Brinks Olds Hofer Gilson & Lione

[57] ABSTRACT

A method and apparatus are disclosed for forming a confectionary product into a rolled tape. A mass of a confectionary product, such as bubble gum, is formed into a thin, flat, generally rectangular sheet. The flat sheet is then rolled about the leading edge of the sheet. The rolled flat sheet is cut in planes generally perpendicular to the leading edge. Consequently, individual pieces of the confectionary product are produced in the predetermined width and in the form of a rolled tape. Preferably, the sheet of confectionary product is scored along lines perpendicular to the leading edge before the sheet is rolled up to thereby facilitate separation of the individual pieces of confectionary product after the sheet is rolled up.

9 Claims, 4 Drawing Sheets

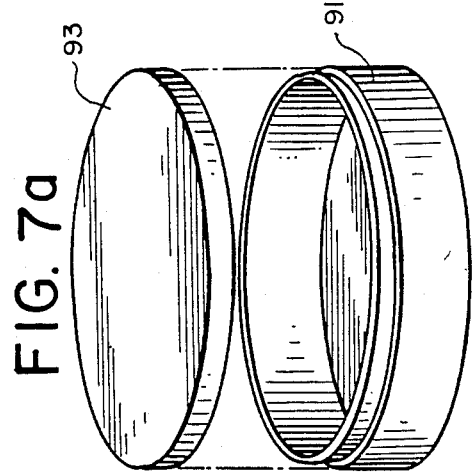
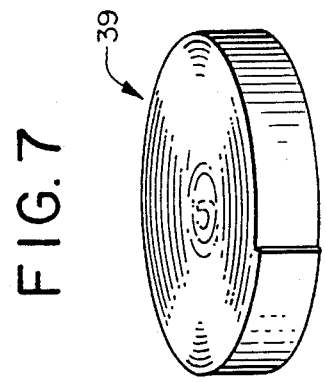
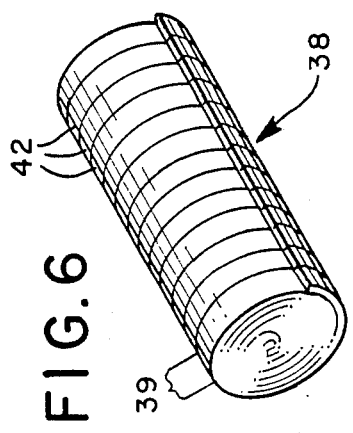
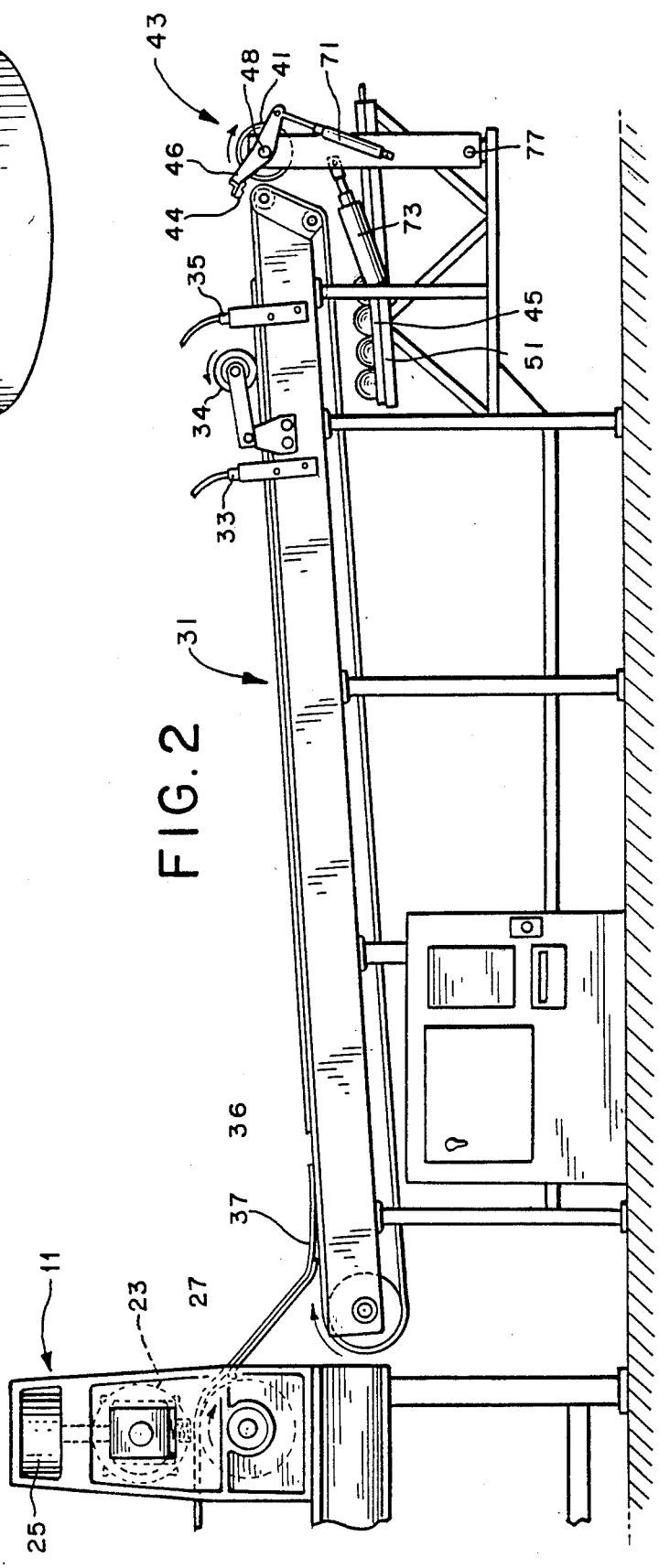

METHOD FOR FORMING A CONFECTIONARY PRODUCT INTO A ROLLED TAPE

BACKGROUND OF THE INVENTION

The present invention relates to the field of confectionary products. More particularly, the invention relates to the field of confectionary products which have been formed into special shapes.

Confectionary products have been molded, extruded or otherwise shaped into various forms over the years. For example, bubble gum has been formed into shapes such as flat sticks, cylinders, cubes, cigars, shredded chew, and the like. It is generally known that providing a confectionary product, such as bubble gum, in novelty shapes or forms can lead to enhanced marketability of such a product, particularly with younger consumers.

One form for a confectionary product that has been previously known to the assignee of the present invention, is that of a rolled up tape. It has been believed that chewing gum or other confectionary products made in the form of a rolled tape would be well-received. In particular, it was thought that chewing gum in the form of a rolled up tape of between 3 and 6 feet in length would give a consumer the chance to break off the desired size of piece to chew, saving the rest for later.

Unfortunately though, no practical methods of making such rolled up chewing gum were previously available. Because chewing gum is soft, flexible, ductile, rubbery, easily meltable, and difficult to cut; it has previously been thought to be infeasible to produce chewing gum in the form of a rolled up tape.

SUMMARY OF THE INVENTION

Briefly stated the present invention is a method and apparatus for forming a confectionary product into a rolled tape. The method includes the following steps. First, a mass of a confectionary product, such as bubble gum, is provided. This mass is formed into a thin flat, generally rectangular sheet. The flat sheet is then rolled about the leading edge of the sheet. The rolled flat sheet is cut in planes generally perpendicular to the leading edge. Consequently, individual pieces of the confectionary product are produced in the predetermined width and in the form of a rolled tape.

The apparatus of the present invention includes means for forming a mass of confectionary product into a thin, flat, generally rectangular sheet. The apparatus further includes means for rolling the flat sheet about its leading edge, and means for cutting the rolled flat sheet in planes generally perpendicular to the leading edge.

In accordance with a preferred embodiment of the method, the confectionary product is bubble gum. Also, the sheet of bubble gum is preferably cut by scoring the sheet of bubble gum along lines generally perpendicular to the leading edge of the sheet. After the sheet is rolled up, it is separated into individual pieces by breaking the roll along the score lines. Preferably, the rolled up tape of bubble gum is between about 3 and about 6 feet long.

In accordance with a preferred embodiment of the apparatus, the means for forming a flat sheet of confectionary product is an otherwise conventional chewing gum rolling and scoring machine which has been modified with respect to its lateral scoring. That is, the machine is modified to score the flat sheet laterally at the desired long lengths for the tape form, e.g. 6 feet.

The present invention has proven advantageous because it has been found to offer a practical means for producing a confectionary product in a form which was previously infeasible, i.e. the form of a rolled up tape. It is particularly advantageous to not separate the individual tapes until after the sheet has been rolled up. It has been found to be less difficult to roll up an entire sheet of confectionary product than it is to roll up individual tapes.

The invention is also advantageous because it can be implemented by making relatively minor modifications to an otherwise conventional chewing gum rolling and scoring machine.

These and other objects, advantages, and features of the present invention will be better understood upon review of the following detailed description of the preferred embodiments read in conjunction with the accompanying drawings.

BRIEF DESCRIPTION OF THE DRAWINGS

FIG. 2 is a side view showing the lateral scoring rollers, the conveyor and the rolling device of the most preferred embodiment.

FIG. 6 is a perspective view of a pre-scored, rolled up sheet of bubble gum.

FIG. 7 is a perspective view of bubble gum formed into a rolled up tape according to the method of the present invention.

FIG. 8 is a perspective view of a preferred package for the product of the present method.

DETAILED DESCRIPTION OF THE PREFERRED EMBODIMENTS

Figure 1:
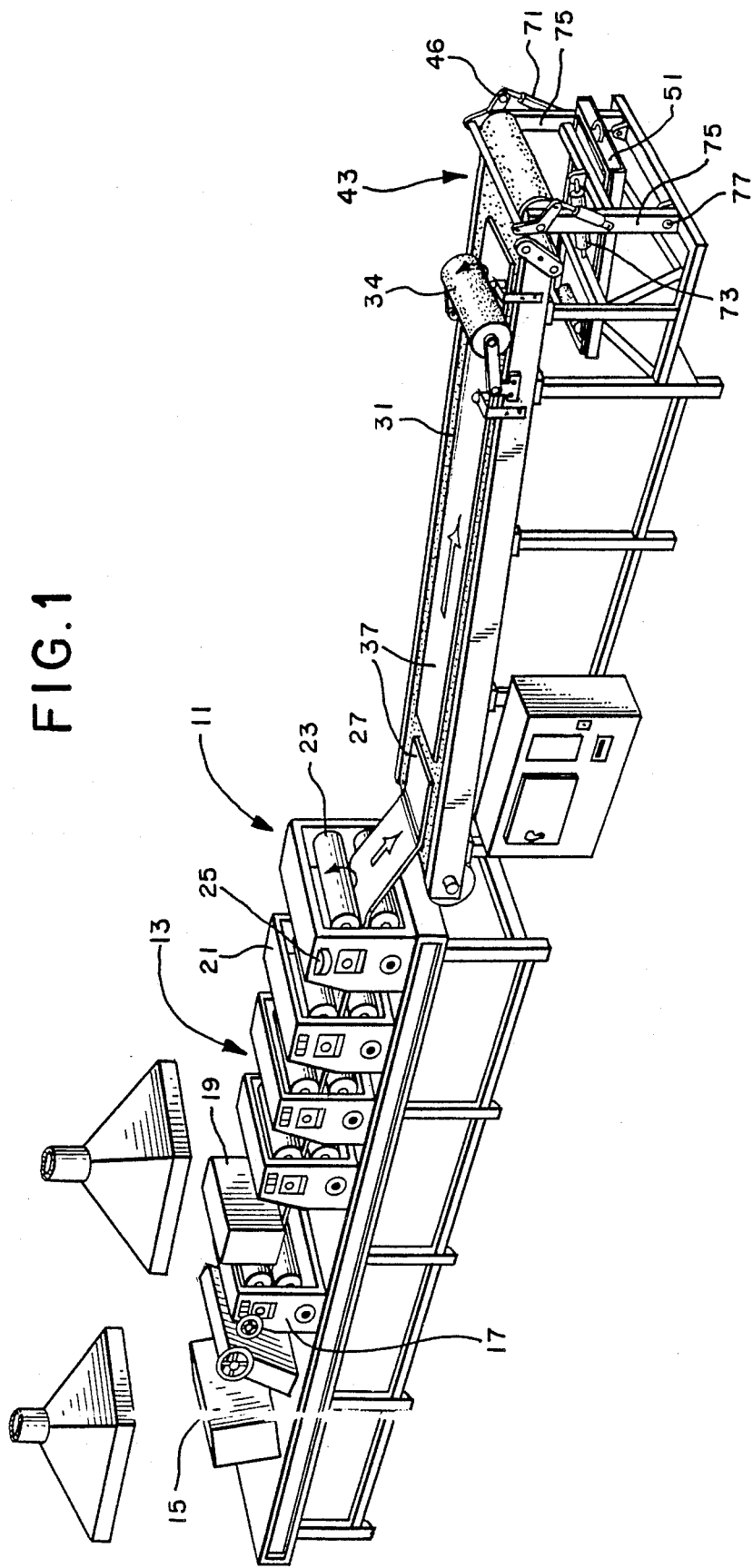
FIG. 1 is a perspective view of the most preferred embodiment of the present invention.
Figure 3:
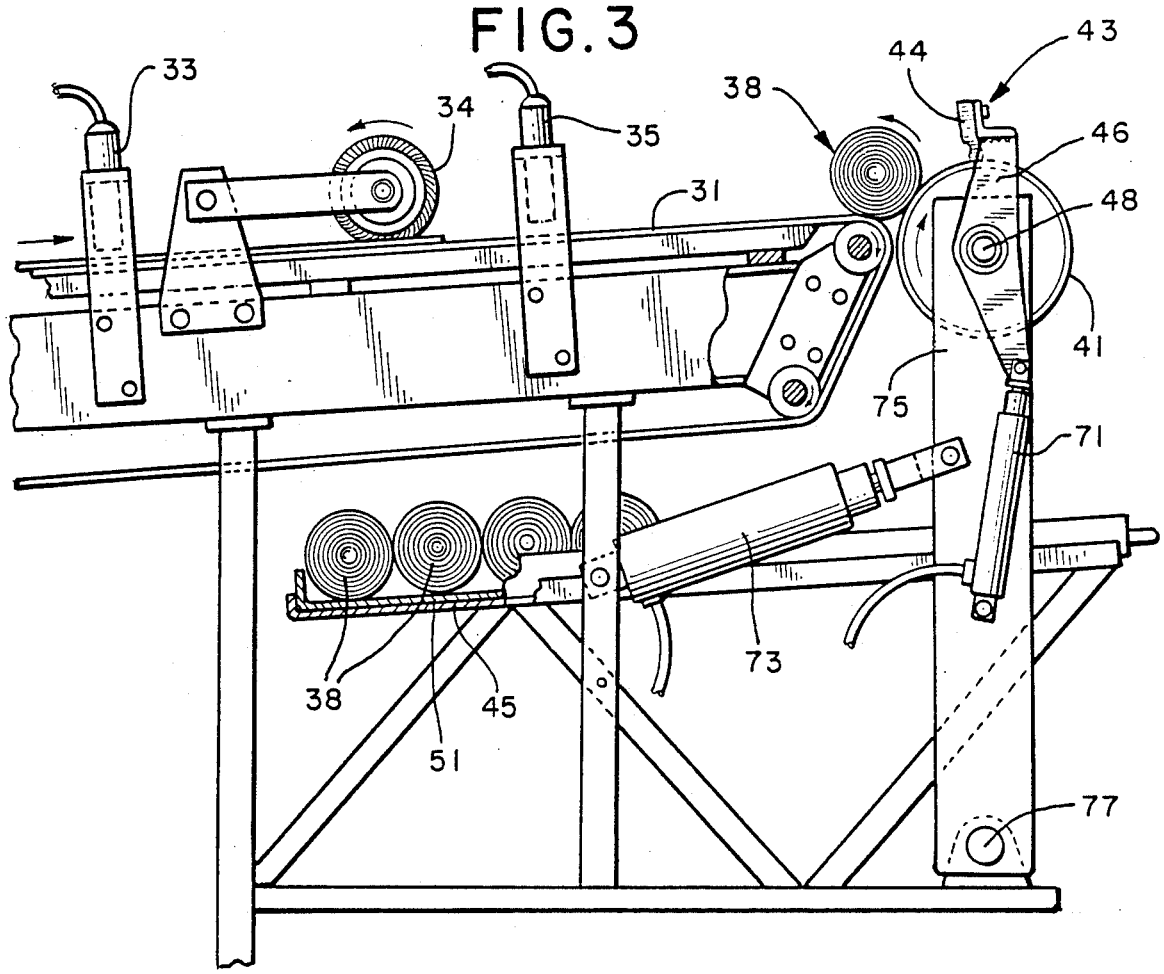
FIG. 3 is an enlarged side view showing a portion of the conveyor and the rolling drum of the most preferred embodiment.
Figure 4:
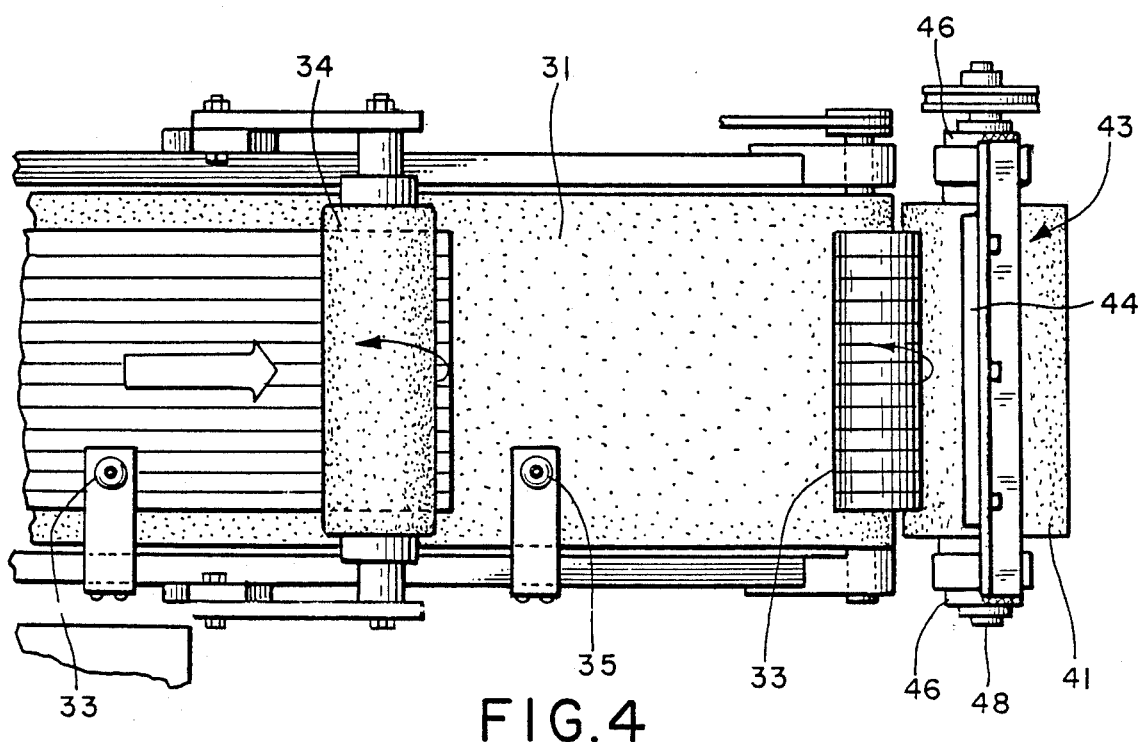
FIG. 4 is a top view of a portion of the conveyor and the rolling drum of the most preferred embodiment.

Referring to the drawings, FIG. 1 shows the most preferred apparatus of the present invention. As shown, the apparatus 11 generally comprises means 13 for forming a flat rectangular sheet of a confectionary product. In accordance with the preferred embodiment depicted, the flat sheet of confectionary product is produced by a conventional chewing gum rolling and scoring machine 13 which has been modified in one respect. Most preferably, the rolling and scoring machine 13 is one such as that purchased from the Gimpel Manufacturing Company, WLS of West Germany is another company which manufactures a suitable chewing gum rolling and scoring machine. Other machines with the ability to roll or extrude a sheet of confectionary product can also be used.

The machine 13 includes an input port 15 into which a mass of the confectionary product is put. Preferably, the confectionary product is chewing gum, most preferably, bubble gum. Alternatively, other confectionary products such as taffy, caramel, or chewy candy, and the like can be used. It is required that the confectionary product possess sufficient pliability, at least at the time of manufacture, to be formed into a rolled up tape.

A series of rollers 17 act on the mass of confectionary product to form a relatively thin flat sheet. A dusting apparatus 19 is included for dusting the sheet in order to reduce any adhesiveness. Typically, starch is used as the dusting compound.

The rectangular sheet of confection product is preferably scored along lines generally perpendicular to the leading edge before it is rolled up. This longitudinal scoring is accomplished in the same way that it is accomplished in making conventional stick chewing gum. That is, the longitudinal scoring drum 21 engages the sheet of chewing gum as it travels beneath it. Most preferably the gum is scored longitudinally to a land of about 0.010".

Alternatively, the means for producing the flat sheet does not score the flat sheet. In such an embodiment, the rolled up sheet is cut into the individual pieces with conventional means such as rotating knives, wires, and the like. However, because of the relative difficulty in cutting several layers of chewing gum, the method using prescoring is clearly preferable.

As in the original machine, the outermost blades of the roller 21 are adapted to cut through the sheet to thus trim the sides of the sheet and achieve the desired width for the sheet. Most preferably, the width of the sheet is about 9 and ¾", and the width between longitudinal scores is about ¾". As such, the sheet will preferably be broken into 13 individual tapes.

The machine 13 is modified with respect to its lateral scoring operation. In a conventional rolling and scoring machine, the lateral scoring drum 23 is designed to score the gum at the desired lengths for individual sticks of gum. However, in accordance with the depicted embodiment, the lateral cutting rollers 23 are modified so as to score the sheet at much longer intervals, e.g. 6 feet. Most preferably, this is accomplished by keeping the roller with the lateral blades biased above the flat sheet until the proper time to cut the flat sheet.

Referring to FIG. 2, the modification in the lateral scoring increment is accomplished by removing the height adjustment screws which are ordinarily used to adjust the vertical position of the roller 23 with respect to the flat sheet. The springs 27, which are included in the conventional machine for biasing the roller into contact with the height adjusting screw, then pushes the roller 23 completely off of the flat sheet as it passes by.

Actuating means, such as an air cylinder 25 on each side of the roller, is used to push the roller 23 down at the appropriate time to cut the desired length for the tape. In the most preferred embodiment shown, the air cylinders are activated at every fourth complete revolution of the lateral cutting roller 23. At this interval, the sheet is scored at 6 foot lengths. The signal to activate the air cylinders in the depicted embodiment is provided by affixing a protrusion (not shown) to the gear which drives the roller 23. The protrusion is adapted to hit a switch. The switch is connected to a counter which counts the desired number of revolutions, most preferably 4, and then activates a solenoid valve which, in turn, activates the air cylinders 25.

The depth of the lateral score is preferably determined by a point on the journal assembly for the roller 23 coming into contact with a stop on each side of the roller. Currently, the stops as designed for the original machine are at an appropriate height. Alternatively, these stops can be replaced by screws or the like to finely adjust the depth of the cut. Most preferably, the land left by the lateral score is approximately 0.002".

After passing under the roller 23, the sheet of confectionary product 37 is carried on a conveyor belt 31. The conveyor belt 31 is similar to that used conventionally, except that it is required to be long enough to carry the full length of the sheet. In the depicted embodiment which is adapted to make 6 foot lengths of tape, the conveyor belt 31 should be at least 7 feet long.

As with conventional stick gum making apparatus, the linear speed of the conveyor belt is intentionally set higher than the linear speed of the sheet coming out of the rollers. Preferably, the linear speed of the sheet is about 90 feet per minute as it exits the rollers, while the linear speed of the conveyor is about 130 feet per minute. As such, the conveyor 31 slides under the sheet 37 until the time at which the sheet passes under the breaking brush 34. The breaking brush is a freely-rotating, cylindrical brush which exerts sufficient downward force on the sheet so that the sheet at that point is positively engaged with the belt 31 below. When this happens, the sheet is pulled at the same speed as the conveyor and the sheet is thus broken at the lateral score line to thereby separate the sheet into the desired length for the rolled up tape.

Referring now also to FIGS. 3, 4, and 5a-d. after the leading edge 36 of the sheet passes under the breaking brush 34, it continues toward a rotating drum 41.

The rotating drum is mounted on an arm 75 which pivots about the point 77. A double-acting air cylinder 73 moves the rotating drum between a rolling position, as shown in FIGS. 1, 4, and 5a-5d, and an exit position shown in FIG. 5e. The air cylinder 73 is activated into the rolling position by receiving a signal generated by proximity switch 33 which detects the leading edge 36 of the sheet passing under it. The air cylinder is moved to the exit position in response to a signal generated after a specified time, measured by a timer (not shown) has elapsed.

The rotating drum is driven by a motor and chain (not shown) preferably between about 240 and about 300r.p.m. The surface of the rotating drum is preferably polyurethane which has been roughened to increase the friction between the drum and the sheet to be rolled. Preferably, the diameter of the rotating drum is about 4.375".

Associated with the rotating drum is a curling plate 43 which is mounted on an arm 46. The arm 46 pivots about the axle 48 for the rotating drum 41. The double-acting air cylinder 71 moves the curling plate between a curling position as shown in FIGS. 1, 4, 5a and 5b, and a non-engaged position as shown in FIGS. 5c and 5d. As with the rotating drum, the air cylinder 71 is activated into the curling position by receiving a signal generated by the proximity switch 35, which detects the leading edge of the sheet passing under it. The air cylinder 71 is moved to the non-engaged position in response to a signal generated after a specified time, measured by a timer (also not shown) has elapsed.

Most preferably, the curling plate 43 comprises a block of teflon 44 with a groove cut in its length. Most preferably, the groove has a radius of 0.375". When in the curling position, the lowest point on the curling plate 43 is about 0.375" above the highest point on the conveyor 31.

Figure 5A:
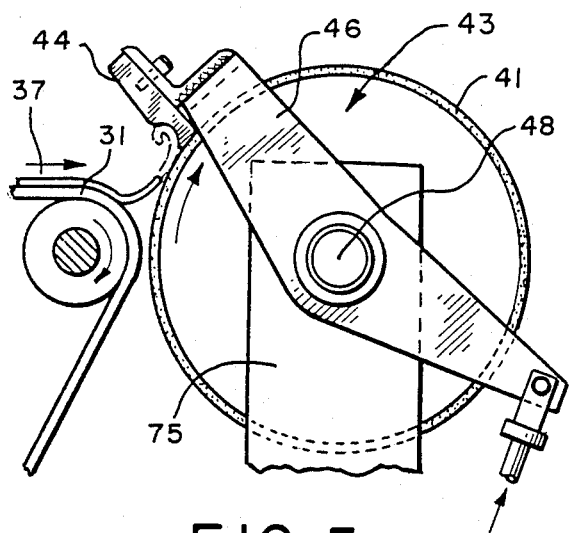
FIGS. 5a–d are a series of side views showing the operations of the rotating drum and curling plate as a sheet of bubble gum is rolled around its leading edge.
Figure 5B:
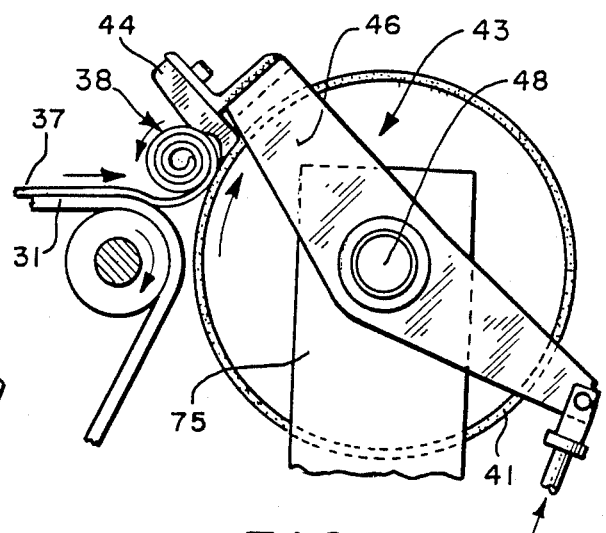
Figure 5C:
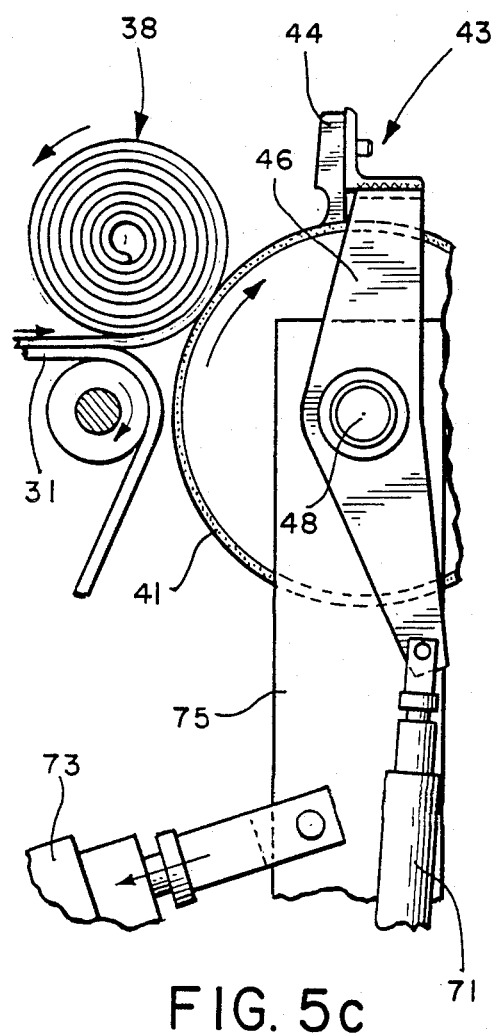
Figure 5D:
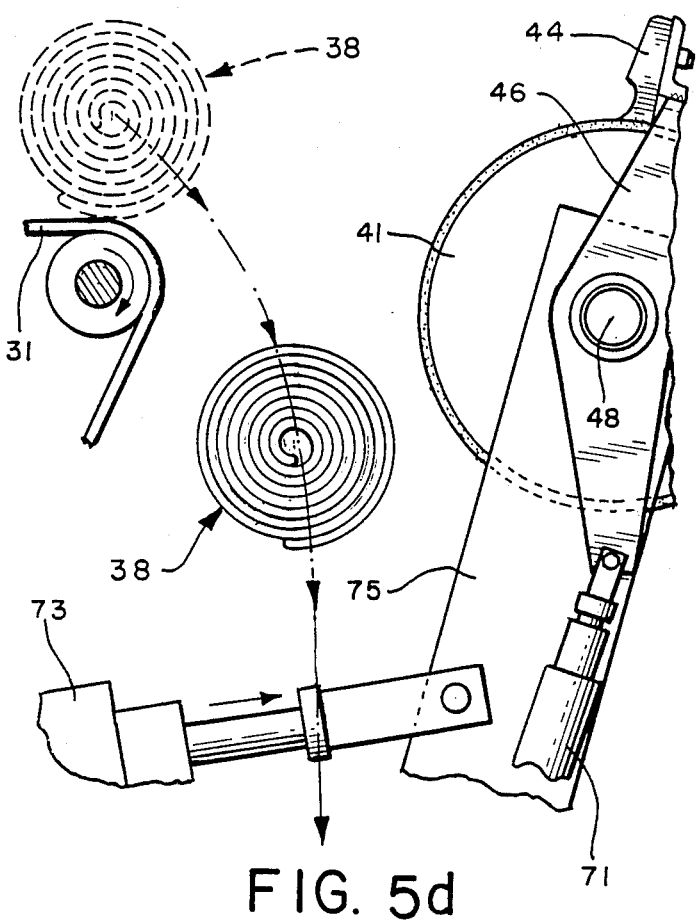

FIGS. 5a-5d will now be used to explain the operation of the preferred rolling means for the present invention. FIG. 5a shows the rotating drum 41 and the curling plate 43 in place to begin rolling the sheet 37 about its leading edge 36. As the leading edge is propelled by the conveyor 31 into contact with the rotating drum 41, the leading edge is moved upward. Then, as the leading edge contacts the curved surface on the curling plate 43, it is moved in the direction opposite that of the conveyor 31. As shown in FIGS. 5a and 5b, as the conveyor and rotating drum continue to push the sheet, the sheet is rolled about the leading edge 36.

As shown in FIG. 5c, after sufficient time to get the rolling of the sheet started, the curling plate 43 is moved into the non-engaged position. This is important because the rolled up sheet will eventually have a diameter larger than would fit between the conveyor and the curling plate. Most preferably, the curling plate is moved back after 0.2 seconds, typically the time for the sheet to be wrapped 3 or 4 revolutions.

After the curling plate is moved back, the sheet is continued to be rolled by virtue of the movement of the conveyor and the rotating drum. Eventually, the sheet will be completely rolled up into a roll 38. Preferably, each 6 foot sheet is wound with about 17 revolutions. Naturally, sheets of a shorter length would be wound with fewer revolutions. At the speeds of the depicted embodiment, the rolling of each sheet takes less than 2.75 seconds to be completed.

As shown in FIG. 5d, after the roll is completed, the rotating drum is pulled back into the exit position whereupon the completed roll 38 is allowed to drop between the end of the conveyor and the drum to the tray 81 below. Preferably, the tray is set at an angle so that the completed rolls can roll away from the point where they first fall. As such, several rolls can be collected on a tray. Once the tray is filled, it is removed and another tray is inserted to receive more falling rolls.

FIG. 6 shows a completed roll 38. As shown, the sheet in the roll is prescored along lines 42. It has been found that, when the sheet has been prescored in this way, the individual pieces of the confectionary product are easily separated. Presently, it is preferred to pull the individual pieces of the roll apart manually. Alternatively, apparatus may be designed to perform this task.

FIG. 7 shows an individual piece 39 of confectionary product made according to the invention in the form of a rolled up tape. Preferably, this tape is between about 1 and about 12 feet long, more preferably is between about 6' and about 6'2" long, most preferably, 6 feet long.

According to this preferred embodiment, the flat sheet is scored laterally only to cut the sheet to the desired length. In alternative embodiments, the flat sheet is also scored laterally so as to aid the consumer in breaking off predetermined lengths of the confectionary product. For example, the sheet could be scored at lengths from 1 to 4". Naturally, such additional lateral scoring would be at depths shallower than that of the main lateral score which is used to separate individual flat sheets.

The width of the piece 39 is preferably the same as that for a conventional stick of chewing gum. i.e. about 0.75". Alternatively, the width can vary between about 0.25" and about 2".

In an alternative embodiment, a food grade dye or the like is used to print on the confectionary product before it is rolled up. In particular. printing means can be provided between the rolling and scoring machine 13 and the rolling apparatus. Such printing means can, for example, be used to print measuring indicia such as found on a measuring tape. Other types of novelty designs can also be printed.

In another alternative embodiment, designs or indicia can be effected on the flat sheet by indentation. In particular, a plate or wheel can be used to impress a design into the flat sheet of confectionary product before it is rolled up.

FIG. 8 shows a preferred package for the confectionary product of the present invention. The package comprises a relatively flat cylindrical cup 91 with a lid 93. Alternatively, other forms of packaging can be used, such as a more sophisticated plastic dispenser, a fin-sealed cellophane package, or a small box.

In accordance with the preferred method of the present invention, the confectionary product to be formed into a rolled up tape is a bubble gum product. It is not seen that the specific formulation of the bubble gum is critical to the performance of the present method. In general, the bubble gum formulation should allow for sufficient flexibility and pliability for the sheet of bubble gum to be rolled up. Also, the formulation for the bubble gum, including the amount and type of dusting, should be selected so as to avoid adhesion of the bubble gum to itself during rolling, packaging, or storing of the product.

An example of a preferred bubble gum formulaton is as follows: (percentages are percent by weight)

| Gum Base | 20% |
| Powdered Sugar | 67.5% |
| Glucose | 8% |
| Glycerin | 3% |
| Flavor | 1% |
| Lecithin | 0.5% |

Alternatively, the confectionary product is a chewing gum such as a mint flavored, or cinnamon flavored gum. Also, other confectionary products, such as taffy, caramel, or chewy candy can be used.

It should be noted that although much of the discussion has involved the production of bubble gum. other types of gum and confectionary products are also within the scope of the present invention. Also, although it is preferred to modify an existing chewing gum rolling and scoring machine, other means for producing the flat sheet of confectionary product can be used. Certainly these and all other modifications which are within the ordinary skill in the art to make are considered to lie within the scope of the invention as defined by the appended claims.

I claim:

1. A method of forming a confectionary product into a rolled tape comprising the steps of:
   providing a mass of chewing gum;
   forming said mass into a thin, flat, generally rectangular sheet having a leading edge;
   rolling said flat sheet about said leading edge; and
   cutting said rolled flat sheet in planes generally perpendicular to said leading edge to thereby produce a plurality of individual pieces of said chewing gum of a predetermined width in the form of a rolled tape.

2. A method of forming a confectionary product into a rolled tape comprising the steps of:
   providing a mass of confectionary product;
   forming said mass into a thin, flat, generally rectangular sheet having a leading edge;
   rolling said flat sheet about said leading edge; and
   cutting said rolled flat sheet in planes generally perpendicular to said leading edge to thereby produce a plurality of individual pieces of said confectionary product of a predetermined width in the form of a rolled tape, wherein said cutting step comprises scoring said flat sheet of confectionary product along score lines generally perpendicular to said leading edge prior to rolling said flat sheet, and after rolling said flat sheet, separating said rolled flat sheet along said score lines to produce said plurality of individual pieces of said confectionary product of a predetermined width in the form of a rolled tape.

3. The method of claims 1 or 2 wherein said rolling step comprises moving said flat sheet toward a rotating drum whereby when said leading edge contacts said rotating drum, and when said flat sheet is continued to be moved toward said rotating drum, the flat sheet is rolled about the leading edge.

4. The method of claim 3 wherein said rolling step further comprises contacting the leading edge with a curling plate means after initial contact with the rotating drum to cause said leading edge to change direction and thereby initiate rolling of the flat sheet.

5. The method of claim 4 wherein said flat sheet is moved toward said rotating drum on a conveyor belt, and wherein said rotating drum is adapted to be moved between a rolling position wherein the flat sheet is rolled, and an exit position wherein the rolled flat sheet is allowed to drop between the conveyor belt and the rotating drum.

6. The method of claim 5 wherein said rolling step further comprises contacting the leading edge with a curling plate means after initial contact with the rotating drum to cause said leading edge to change direction and thereby initiate rolling of the flat sheet.

7. The method of claim 1 or 2 wherein said rolling step comprising rolling said flat sheet about a spindle which spindle is removed after the rolling step.

8. A method of forming a confectionary product into a rolled tape comprising the steps of:

providing a mass of chewing gum;

forming said mass into a thin, flat, generally rectangular sheet having a leading edge;

scoring said flat sheet of chewing gum along score lines generally perpendicular to said leading edge;

rolling said flat sheet about said leading edge by moving said flat sheet toward a rotating drum whereby when said leading edge contacts said rotating drum, and when said flat sheet is continued to be moved toward said rotating drum, the flat sheet is rolled about the leading edge; and separating said rolled flat sheet along said score lines to thereby produce a plurality of individual pieces of said chewing gum of a predetermined width in the form of a rolled tape.

9. The method of claim 5 wherein said rolling step further comprises contacting the leading edge with a curling plate means after initial contact with the rotating drum to cause said leading edge to change direction and thereby initiate rolling of the flat sheet.

* * * * *